(12) United States Patent
Panchaksharaiah et al.

(10) Patent No.: US 12,096,067 B2
(45) Date of Patent: *Sep. 17, 2024

(54) INTELLIGENT DISPLAY OF CONTENT BASED ON EVENT MONITORING

(71) Applicant: Rovi Guides, Inc., San Jose, CA (US)

(72) Inventors: Vishwas Sharadanagar Panchaksharaiah, Karnataka (IN); Vikram Makam Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,121

(22) Filed: Sep. 15, 2021

(65) Prior Publication Data

US 2022/0007071 A1 Jan. 6, 2022

Related U.S. Application Data

(63) Continuation of application No. 16/264,870, filed on Feb. 1, 2019, now Pat. No. 11,153,635.

(51) Int. Cl.
*H04N 5/445* (2011.01)
*G06F 3/00* (2006.01)
*G06F 9/54* (2006.01)
*G06F 13/00* (2006.01)
*H04N 21/431* (2011.01)
*H04N 21/44* (2011.01)
*H04N 21/472* (2011.01)

(52) U.S. Cl.
CPC ......... *H04N 21/4316* (2013.01); *G06F 9/542* (2013.01); *H04N 21/44004* (2013.01); *H04N 21/47202* (2013.01); *H04N 21/47205* (2013.01); *H04N 21/47217* (2013.01)

(58) Field of Classification Search
CPC ......... H04N 21/4316; H04N 21/44004; H04N 21/47202; H04N 21/47205; H04N 21/47217; H04N 21/2187; H04N 21/44209; H04N 21/4882
See application file for complete search history.

(56) References Cited

U.S. PATENT DOCUMENTS

| 7,761,892 B2 | 7/2010 | Ellis et al. |
| 9,615,124 B1 | 4/2017 | Gupta et al. |
| 9,788,062 B2 | 10/2017 | Dimov et al. |

(Continued)

OTHER PUBLICATIONS

PCT International Search Report and Written Opinion for International Application No. PCT/US2020/015945, dated Jul. 10, 2017 (13 Pages).

(Continued)

*Primary Examiner* — Gigi L Dubasky
(74) *Attorney, Agent, or Firm* — Haley Guiliano LLP

(57) ABSTRACT

Systems and methods for displaying content based on event monitoring are disclosed herein. Control circuitry plays a delayed portion of a live content stream via a primary display window. The control circuitry detects an event in the live content stream and plays the event via a secondary display window overlaid upon the primary display window. The control circuitry determines whether to modify an aspect of a secondary display window based on the event and modifies the aspect of the secondary display window based on a result of the determining.

20 Claims, 13 Drawing Sheets

(56) References Cited

U.S. PATENT DOCUMENTS

| | | | |
|---|---|---|---|
| 10,297,287 B2 | 5/2019 | Maisenbacher et al. | |
| 11,350,172 B2* | 5/2022 | Panchaksharaiah | H04N 21/47205 |
| 2005/0193425 A1 | 9/2005 | Sull et al. | |
| 2006/0200842 A1* | 9/2006 | Chapman | H04N 21/235 348/E7.061 |
| 2012/0124170 A1 | 5/2012 | Satheesh | |
| 2014/0067939 A1 | 3/2014 | Packard et al. | |
| 2014/0157307 A1* | 6/2014 | Cox | H04N 21/47214 725/34 |
| 2014/0304715 A1 | 10/2014 | Park et al. | |
| 2015/0019694 A1 | 1/2015 | Feng et al. | |
| 2015/0033253 A1 | 1/2015 | Yoshioka | |
| 2015/0181301 A1 | 6/2015 | Bloch et al. | |
| 2015/0215586 A1* | 7/2015 | Lasko | H04L 65/65 348/143 |
| 2015/0382047 A1 | 12/2015 | Van Os et al. | |
| 2016/0105733 A1 | 4/2016 | Packard et al. | |
| 2017/0070783 A1 | 3/2017 | Printz et al. | |
| 2017/0223395 A1* | 8/2017 | Elliot | H04N 21/2402 |
| 2017/0300151 A1 | 10/2017 | Lue-Sang et al. | |
| 2017/0332036 A1* | 11/2017 | Panchaksharaiah | H04N 21/4394 |
| 2017/0332116 A1 | 11/2017 | Lee | |
| 2018/0108380 A1 | 4/2018 | Packard et al. | |
| 2018/0152737 A1* | 5/2018 | Mathur | H04N 21/26258 |
| 2020/0252680 A1 | 8/2020 | Panchaksharaiah et al. | |
| 2020/0252693 A1 | 8/2020 | Panchaksharaiah et al. | |

OTHER PUBLICATIONS

U.S. Appl. No. 16/264,861, filed Feb. 1, 2019, Vishwas Sharadanagar Panchaksharaiah.

U.S. Appl. No. 17/734,430, filed May 2, 2022, Vishwas Sharadanagar Panchaksharaiah.

* cited by examiner

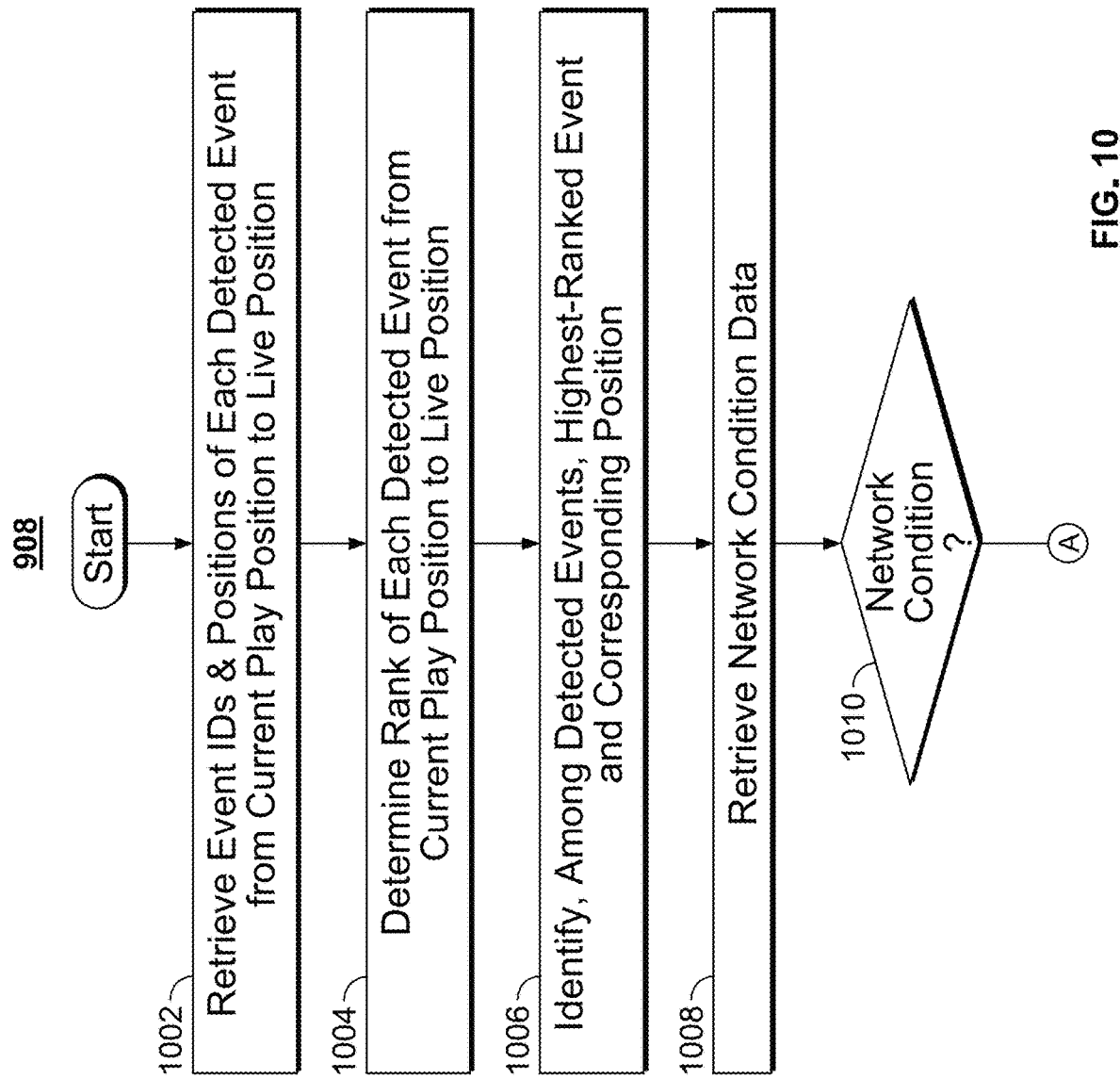

INTELLIGENT DISPLAY OF CONTENT BASED ON EVENT MONITORING

CROSS-REFERENCE TO RELATED APPLICATIONS

This application is a continuation of U.S. patent application Ser. No. 16/264,870, filed Feb. 1, 2019. The disclosure of which is hereby incorporated by reference herein in its entirety.

BACKGROUND

The present disclosure relates to systems for streaming content and, more particularly, to systems and related processes for detecting events within a live content stream and controlling the display of content and/or navigation menu options based on the detected events.

SUMMARY

When a smartphone, a personal computer, or another computing device streams live content, such as audio/video content, over a communication network, at various times and for a variety of reasons the device may display a delayed portion (e.g., a non-live portion) of the live content stream. For instance, a user may opt to play back an earlier, non-live portion of the content stream by selecting a navigation menu option (e.g., a rewind option, a segment selection option, or the like) to navigate to the earlier portion. As another example, a buffer underrun may cause a time delay between the transmission of the live content stream and the playback of the content stream via the device, and the time delay may cause playback of the live content stream to stall. In some instances, a user may not even realize that the content that the device is displaying is not live but, rather, delayed.

When the device is displaying a delayed portion of the live content stream, a user may wish to be presented with useful options for viewing, and/or navigating to, other portions of the content stream, such as to the presently live portion of the stream, or back to the portion of the stream from which the user had navigated to the delayed portion, or to yet another delayed portion of the stream. Providing the user with such useful options, however, is technically challenging since the user's preference as to the portion of the stream to which to navigate may vary depending upon a variety of factors, such as whether—and at which portion of the content stream—any events (e.g., as a score change in a live sporting event or an alert in a live news broadcast) may have occurred. Additionally, the user may wish for the device to automatically navigate to a particular portion of the content stream under some circumstances. Furthermore, in some cases, depending upon the specific content of portions of the stream or other factors, the user may wish to view multiple portions of the content stream simultaneously. Enabling the user to view multiple portions of the content stream simultaneously, however, is also technically challenging, owing to a variety of factors, such as a bit rate, a network delay, or other quality-of-service-related (QoS-related) factors associated with the communication of the content stream to the device over the network. Accordingly, it would be desirable to have systems and methods for detecting events within a live content stream and controlling the display of content and/or navigation menu options based on the detected events and/or other relevant factors.

In view of the foregoing, the present disclosure provides systems and related methods that monitor a live content stream to detect events and control the display of content based on detected events. For instance, one such system includes a communication port configured to receive a live content stream via a communication network and a memory configured to buffer the received live content stream for playback. The system also includes control circuitry that is configured to play a delayed portion of the live content stream, such as a delayed portion of the stream to which a user has navigated or a portion of the stream that is delayed owing to a QoS-related factor. The control circuitry detects an event in the content stream, determines a rank of the event, and, based on the rank of the event, determines whether to play the event instead of the delayed portion of the live content stream. In response to determining to play the event, the control circuitry plays the event instead of the delayed portion of the live content stream. In this manner, for instance, if a user is viewing a delayed portion of the live content stream and an important event (e.g., with importance being related to the rank of the event) occurs at another portion of the stream, the system may automatically navigate to that other portion of the stream to play the important event.

In some aspects, the event is a first event and the control circuitry is further configured to detect a second event in the live content stream, with the first event occurring earlier than, later than, or at the same time as the second event in the content stream. The control circuitry may further determine a rank of the second event, determine that the rank of the first event is greater than the rank of the second event and, in response, play the first event instead of the second event or play the second event after the first event has been played. In a further aspect, the event is one event of multiple detected events, and the control circuitry is further configured to generate event identifiers, ranks, and time segment information for each of the detected events and store the event identifiers, ranks, and time segment information for each of the events in memory for subsequent analysis of the events. In some cases, the control circuitry is further configured to determine that the rank of the one event is a greatest rank among the ranks of the multiple detected events and, in response, cause the one event to be played. Detecting multiple events and assigning respective ranks to those events enables the system to provide a variety of useful options for displaying, and/or navigating to, relevant portions of the live content stream. Such options, for example, may be presented via a graphical user interface (GUI) for selection by the user, may be automatically selected by the system without any user input, or may be configured based on a user-defined or system-defined configuration setting.

In another aspect, the control circuitry is further configured to identify a time segment of the live content stream to which the event corresponds, and the playing of the event includes shifting a playback position to the identified time segment. The time segment of the live content stream to which the event corresponds may occur between the delayed portion of the live content stream and a live portion of the live content stream or, in another example, may include a live portion of the live content stream. By identifying respective time segments (e.g., having start times, end times, durations, and/or the like) of events detected in the content stream, the system can navigate to the proper portions of the stream for playback of those events.

The control circuitry may be configured to trigger analysis of the live content stream in a variety of ways. For instance, the control circuitry may be configured to detect a delay (e.g., an amount of time) between the delayed portion of the live content stream and a live portion of the live content stream and, in response to detecting the delay, analyze the live content stream to detect the event. Alternatively or in addition, the control circuitry may be configured to detect that an amount of time associated with a predetermined repetition rate has elapsed since the event was detected and analyze the live content stream to detect an additional event in response to detecting that the amount of time associated with the predetermined repetition rate has elapsed. By triggering the analysis of the live content stream in such a way, the system may detect events in the stream without inefficiently overutilizing computing resources.

In another aspect, the present disclosure provides systems and related methods that monitor a live content stream to detect events and control the display of content and/or navigation menu options based on detected events. For instance, one such system includes a communication port configured to receive a live content stream via a communication network, a memory configured to buffer the received live content stream for playback, and a display configured to present a primary display window and a secondary display window. The system also includes control circuitry configured to play a delayed portion of the live content stream in the primary display window, detect an event in the live content stream, and determine whether to modify an aspect of the secondary display window based on the event. For instance, the event may be played via the secondary display window, with the secondary display window being overlaid upon the primary display window. If the control circuitry determines that the aspect of the secondary display window is to be modified, the control circuitry modifies the aspect of the secondary display window. For example, the control circuitry may modify a frame rate at which the event is played via the secondary display window, a size of the secondary display window, a bit rate at which the event is played via the secondary display window, and/or another aspect of the secondary window.

In some aspects, the control circuitry may also be configured to determine a status of a communication network by which the live content stream is communicated and determine whether to modify the aspect of the secondary display window based at least in part on the status of the communication network. For example, the status of the communication network may indicate a rate (e.g., a bit rate, a frame rate, or another type of data rate) at which the live content stream data is communicated via the communication network, and the determination as to whether to modify the aspect of the secondary display window may be based at least in part on the rate at which the live content stream data is communicated via the communication network. In some instances, based on the status (e.g., data rate) of the communication network, the control circuitry may be configured to modify a frame rate at which the event is played via the secondary display window, a bit rate at which the event is played via the secondary display window, or a size of the secondary display window. In still other examples, the control circuitry may be configured to modify an aspect of the primary display window based on the status of the communication network. By modifying aspects of the primary and/or secondary display windows based on the status of the communication network, the system can enable the user to view multiple portions of the content stream without overtaxing computing resources and potentially causing stalls or other degradations in the viewing experience.

In another aspect, the control circuitry may be configured to determine a rank of the event and modify the aspect of the secondary display window based at least in part on the rank of the event. For example, based on the rank determined for the event, the control circuitry may be configured to modify the aspect of the secondary display window by increasing a frame rate at which the event is played via the secondary display window, increasing a bit rate at which the event is played via the secondary display window, and/or increasing a size of the secondary display window. Since the rank of the event may correspond to the relative importance of the event, by modifying aspects of the secondary display window based on the rank of the event, the system may effectively balance how prominently the event is displayed via the secondary display window with the relative importance of the event. In this manner, for instance, for minimally important events, the system can avoid or minimize any disruption to the user's viewing of the content in the primary display window that might be caused by prominently displaying the event via the secondary display window and can reserve such disruptions for important events only.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
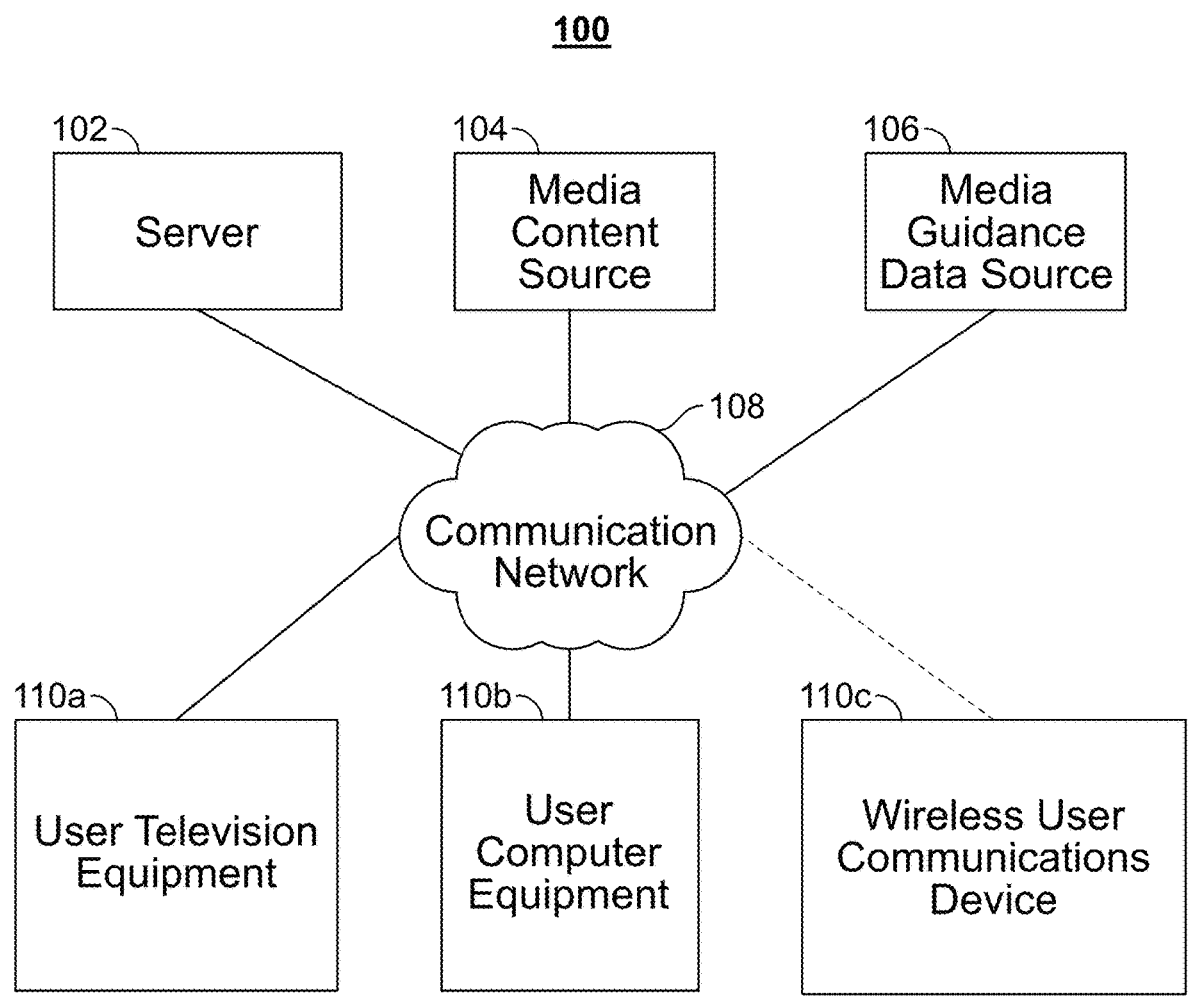
FIG. 1 shows an illustrative block diagram of a system for displaying content based on event monitoring, in accordance with some embodiments of the disclosure.

FIG. 1 shows an illustrative block diagram of a system 100 for displaying content based on event monitoring, in accordance with some embodiments of the disclosure. In various aspects, system 100 includes one or more of server 102, media content source 104, media guidance data source 106, communication network 108, and one or more computing devices 110, such as user television equipment 110a (e.g., a set-top box), user computer equipment 110b, and/or wireless user communications device 110c (e.g., a smartphone device). Although FIG. 1 shows one of each component, in various examples, system 100 may include fewer than the illustrated components and/or multiples of one or more illustrated components. Communication network 108 may be any type of communication network, such as the Internet, a mobile phone network, mobile voice or data network (e.g., a 4G or LTE network), cable network, public switched telephone network, or any combination of two or more of such communication networks. Communication network 108 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 108 communicatively couples various components of system 100 to one another. For instance, server 102 may be communicatively coupled to media content source 104, media guidance data source 106, and/or computing device 110 via communication network 108.

In some examples, media content source 104 and media guidance data source 106 may be integrated as one device. Media content source 104 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 104 may be the originator of content (e.g., a television broadcaster, a Webcast provider, etc.) or may not be the originator of content (e.g., an on-demand content provider, an Internet provider of content of broadcast programs for downloading, etc.). Media content source 104 may include cable sources, satellite providers, on-demand providers, Internet providers, over-the-top content providers, or other providers of content. Media content source 104 may also include a remote media server used to store different types of content (e.g., including video content selected by a user) in a location remote from computing device 110. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 104 and media guidance data source 106 may provide content and/or media guidance data to computing device 110 and/or server 102 using any suitable approach. In some embodiments, media guidance data source 106 may provide a stand-alone interactive television program guide that receives program guide data via a data feed (e.g., a continuous feed or trickle feed). In some examples, media guidance data source 106 may provide program schedule data and other guidance data to computing device 110 on a television channel sideband, using an in-band digital signal, an out-of-band digital signal, or any other suitable data transmission technique.

As described in further detail below, server 102 manages the communication of a live content stream (e.g., a live sporting event broadcast, a live news broadcast, or the like) from media content source 104 to computing device 110 via communication network 108. For instance, in some embodiments, content from media content source 104 and/or guidance data from media guidance data source 106 may be provided to computing device 110 using a client/server approach. In such examples, computing device 110 may pull content and/or media guidance data from server 102 and/or server 102 may push content and/or media guidance data to computing device 110. In some embodiments, a client application residing on computing device 110 may initiate sessions with server 102, media content source 104, and/or media guidance data source 106 to obtain content and/or guidance data when needed, e.g., when the guidance data is out-of-date or when computing device 110 receives a request from the user to receive content or guidance data. In various aspects, server 102 may also be configured to detect events within the live content stream and, based on the detected events, control the display of content and/or navigation menu options via computing device 110. Additionally, although FIG. 1 shows media content source 104 and media guidance data source 106 as separate from server 102, in some embodiments, media content source 104 and/or media guidance data source 106 may be integrated as one device with server 102.

Content and/or media guidance data delivered to computing device 110 may be over-the-top (OTT) content. OTT content delivery allows Internet-enabled user devices, such as computing device 110, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. YouTube is a trademark owned by Google LLC; Netflix is a trademark owned by Netflix, Inc.; and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 110.

Figure 2:
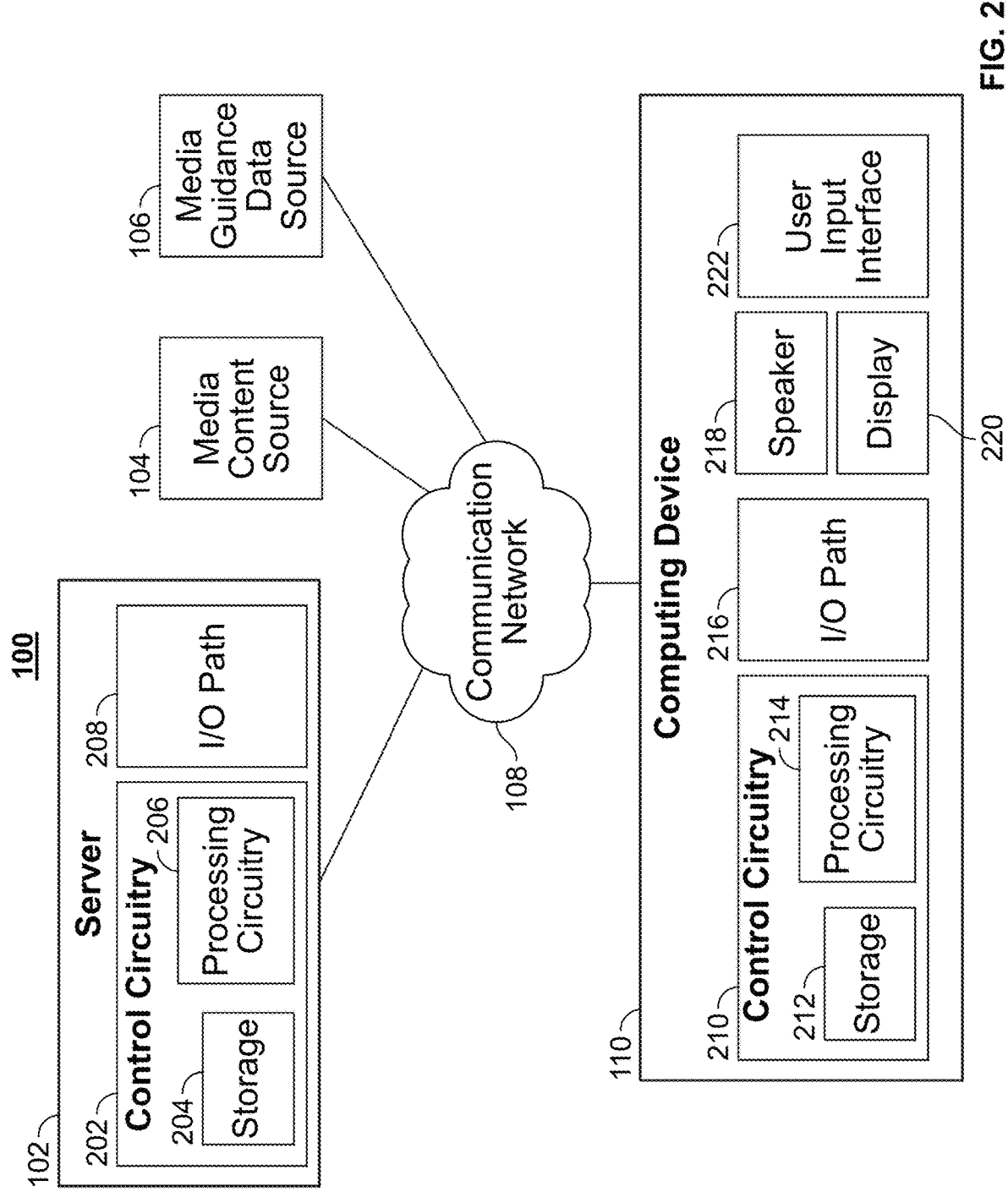
FIG. 2 is an illustrative block diagram showing additional details of the system of FIG. 1, in accordance with some embodiments of the disclosure.

FIG. 2 is an illustrative block diagram showing additional details of the system 100 of FIG. 1, in accordance with some embodiments of the disclosure. In particular, server 102 includes control circuitry 202 and I/O path 208, and control circuitry 202 includes storage 204 and processing circuitry 206. Computing device 110 includes control circuitry 210, I/O path 216, speaker 218, display 220, and user input interface 222. Control circuitry 210 includes storage 212 and processing circuitry 214. Control circuitry 202 and/or 210 may be based on any suitable processing circuitry such as processing circuitry 206 and/or 214. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 204, storage 212, and/or storages of other components of system 100 (e.g., storages of media content source 104, media guidance data source 106, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorder, or PVR), solid state devices, quantum storage devices, gaming consoles, gaming media, or any other suitable fixed or removable storage devices, and/or any combination of the same. Each of storage 204, storage 212, and/or storages of other components of system 100 may be used to store various types of content, media guidance data, and or other types of data. Non-volatile memory may also be used (e.g., to launch a boot-up routine and other instructions). Cloud-based storage may be used to supplement storages 204, 212 or instead of storages 204, 212. In some embodiments, control circuitry 202 and/or 210 executes instructions for an application stored in memory (e.g., storage 204 and/or 212). Specifically, control circuitry 202 and/or 210 may be instructed by the application to perform the functions discussed herein. In some implementations, any action performed by control circuitry 202 and/or 210 may be based on instructions received from the application. For example, the application may be implemented as software or a set of executable instructions that may be stored in storage 204 and/or 212 and executed by control circuitry 202 and/or 210. In some embodiments, the application may be a client/server application where only a client application resides on computing device 110, and a server application resides on server 102.

The application may be implemented using any suitable architecture. For example, it may be a stand-alone application wholly implemented on computing device 110. In such an approach, instructions of the application are stored locally (e.g., in storage 212), and data for use by the application is downloaded on a periodic basis (e.g., from an out-of-band feed, from an Internet resource, or using another suitable approach). Control circuitry 214 may retrieve instructions of the application from storage 212 and process the instructions to perform the functionality described herein. Based on the processed instructions, control circuitry 214 may determine what action to perform when input is received from user input interface 222.

In client/server-based embodiments, control circuitry 210 may include communication circuitry suitable for communicating with an application server (e.g., server 102) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 108). In another example of a client/server-based application, control circuitry 210 runs a web browser that interprets web pages provided by a remote server (e.g., server 102). For example, the remote server may store the instructions for the application in a storage device. The remote server may process the stored instructions using circuitry (e.g., control circuitry 202) and generate the displays discussed above and below. Computing device 110 may receive the displays generated by the remote server and may display the content of the displays locally via display 220. This way, the processing of the instructions is performed remotely (e.g., by server 102) while the resulting displays, such as the display windows described elsewhere herein, are provided locally on computing device 110. Computing device 110 may receive inputs from the user via input interface 222 and transmit those inputs to the remote server for processing and generating the corresponding displays.

A user may send instructions to control circuitry 202 and/or 210 using user input interface 222. User input interface 222 may be any suitable user interface, such as a remote control, trackball, keypad, keyboard, touchscreen, touchpad, stylus input, joystick, voice recognition interface, or other user input interfaces. User input interface 222 may be integrated with or combined with display 220, which may be a monitor, a television, a liquid crystal display (LCD), electronic ink display, or any other equipment suitable for displaying visual images.

Server 102 and computing device 110 may receive content and data via input/output (hereinafter "I/O") path 208 and 216, respectively. For instance, I/O path 216 may include a communication port configured to receive a live content stream from server 102 and/or media content source 104 via a communication network 108. Storage 212 may be configured to buffer the received live content stream for playback, and display 220 may be configured to present the buffered content, navigation options, alerts, and/or the like via a primary display window and/or a secondary display window. I/O paths 208, 216 may provide content (e.g., a live stream of content, broadcast programming, on-demand programming, Internet content, content available over a local area network (LAN) or wide area network (WAN), and/or other content) and data to control circuitry 202, 210. Control circuitry 202, 210 may be used to send and receive commands, requests, and other suitable data using I/O paths 208, 216. I/O paths 208, 216 may connect control circuitry 202, 210 (and specifically processing circuitry 206, 214) to one or more communication paths (described below). I/O functions may be provided by one or more of these communication paths but are shown as single paths in FIG. 2 to avoid overcomplicating the drawing.

Figure 3:
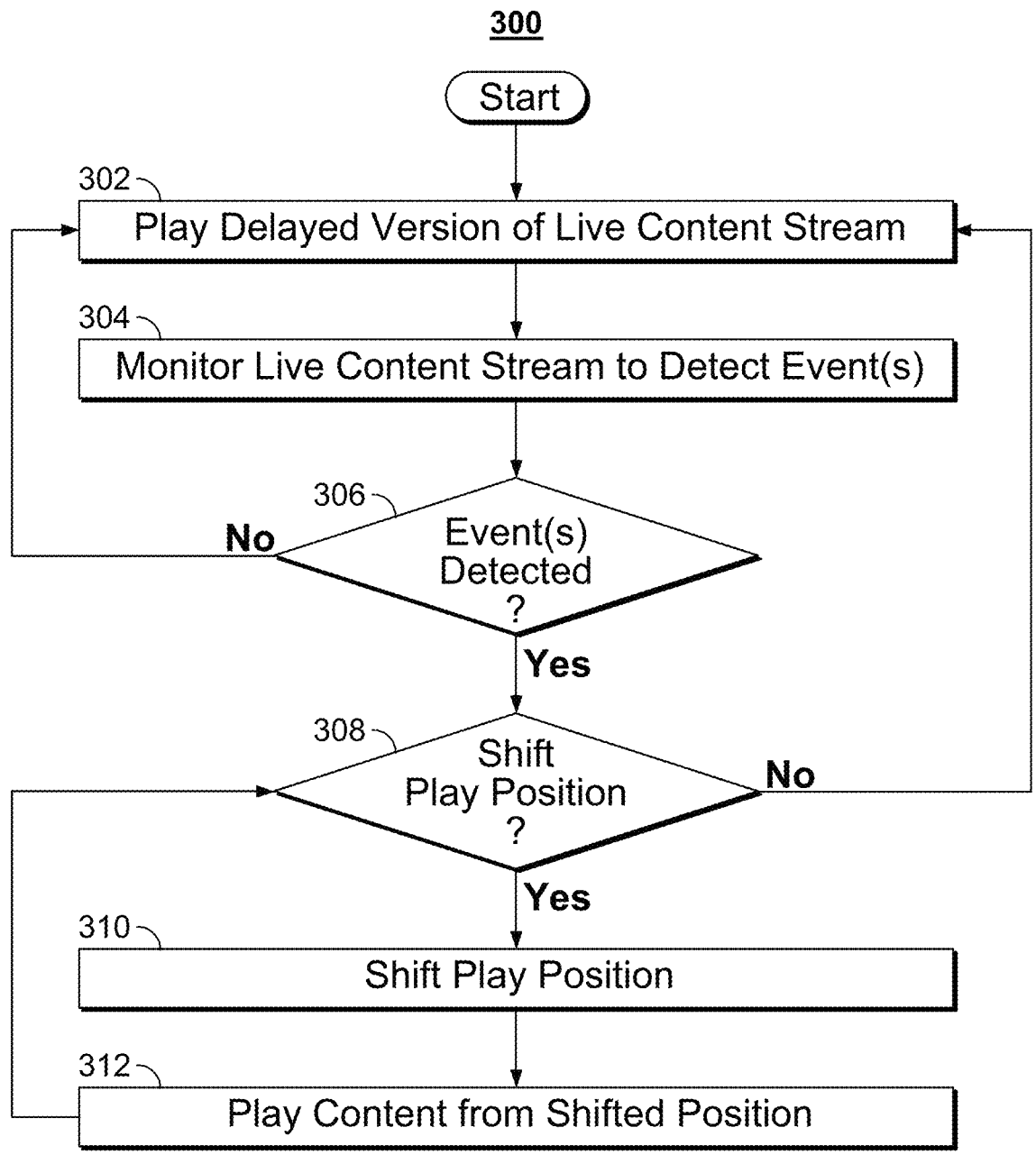
FIG. 3 depicts an illustrative flowchart of a process for displaying content based on event monitoring, in accordance with some embodiments of the disclosure.

Having described system 100, reference is now made to FIG. 3, which depicts an illustrative flowchart of process 300 for displaying content based on event monitoring that may be implemented by using system 100 in accordance with some embodiments of the disclosure. In various embodiments, individual steps of process 300 may be implemented by one or more components of system 100. Although the present disclosure may describe certain steps of process 300 (and of other processes described herein) as being implemented by certain components of system 100, this is for purposes of illustration only, and it should be understood that other components of system 100 may implement those steps instead. For example, steps of process 300 may be executed by server 102 and/or by computing device 110 to monitor a live content stream, detect events in the stream, and control the display of content based on the detected events.

As described above, control circuitry 210 of computing device 110 is configured to receive a live content stream, such as a live sporting event broadcast, a live news broadcast, or the like, from media content source 104 via communication network 108 and I/O path 216 (e.g., via a communication port thereof). Control circuitry 210 buffers the received live content stream in storage 212 for playback via display 220. At 302, control circuitry 210 plays a delayed portion of the live content stream. The portion of the live content stream being played at 302 may be delayed relative to the live portion of the content stream for a variety of reasons. For instance, a user may have selected a navigation menu option (e.g., a rewind option) via user input interface 222 to navigate to an earlier portion of the stream. Alternatively or in addition, the portion of the live content stream being played at 302 may be delayed owing to a QoS-related factor, such as a bit rate, a network delay, or another factor associated with the communication of the content stream to computing device 110 over communication network 108.

At 304, control circuitry 210 monitors the live content stream being received at computing device 110 via communication network 108 to detect any events, such as a score change in a live sporting event or an alert in a live news broadcast, that may occur in the content stream. Additional details regarding how control circuitry 210 may monitor the live content stream at 304 to detect events are provided below in the context of FIG. 4. In general, control circuitry 210 (and/or control circuitry 202) may be configured to trigger analysis of the live content stream in a variety of ways. For instance, control circuitry 210 and/or control circuitry 202 may be configured to analyze portions (e.g., packets) of the content stream as they are communicated to computing device 110 via communication network 108. For example, control circuitry 202 may be configured to analyze each portion or packet of the content stream received from media content source 104 before control circuitry 202 passes the portion of the content stream to computing device 110 via communication network 108. In such an example, if control circuitry 202 detects any events in the portion of the content stream, control circuitry 202 may also communicate event data (described below in connection with FIG. 4) for any detected event(s) to computing device 110 via communication network 108 for use in displaying content and/or navigation menu options based on the event data. As another example, control circuitry 210 may be configured to analyze portions (e.g., packets) of the content stream as they are received from server 102 and/or media content source 104 via communication network 108.

In some cases, analysis of the content stream may be triggered when a predetermined delay arises between the portion of the content stream being played at 302 and the live portion of the content stream. For instance, control circuitry 210 may be configured to detect an amount of the delay (e.g., an amount of time) between the delayed portion of the live content stream being played at 302 and the live portion of the live content stream, determine that the amount of the delay exceeds a threshold delay amount, and, in response, trigger an analysis of the content stream to detect any event(s) that may have occurred at one or more portions of the stream from the delayed portion being played to the live portion. By triggering the analysis of the live content stream based on a delay amount, the system may detect events in the stream without inefficiently overutilizing computing resources.

Alternatively or in addition, analysis of the content stream may be triggered based on a predetermined repetition rate. For instance, control circuitry 210 may be configured to detect that an amount of time (e.g., a repetition period) associated with a predetermined repetition rate has elapsed since an analysis of the content stream was most recently performed (e.g., since any event was detected) and, in response, trigger another analysis of the content stream to detect any additional events that may have occurred in portions of the stream that have not yet been analyzed for events. By triggering the analysis of the live content stream periodically instead of continuously, the system may detect events in the stream without inefficiently overutilizing computing resources.

At 306, control circuitry 210 determines whether one or more events in the content stream have been detected at 304. If no event in the content stream has been detected at 304 ("No" at 306), then the delayed portion of the content stream continues to be played at 302. If, on the other hand, one or more events in the content stream have been detected at 304 ("Yes" at 306), then control circuitry 210 determines at 308 whether—and to which portion of the content stream—to shift a play (or playback) position within the content stream based on the detected event(s). Additional details regarding how control circuitry 210 may make the determination at 308 are provided below in the context of FIG. 5.

If control circuitry 210 determines not to shift a playback position based on the detected event(s) ("No" at 308), then the delayed portion of the content stream continues to be played at 302. If, on the other hand, control circuitry 210 determines, based on one or more events detected at 306, that a play position is to be shifted to another portion of the content stream (e.g., a portion of the content stream that is temporally shifted relative to the portion of the content stream being played at 302) ("Yes" at 308), then, in one example, at 310 control circuitry 210 shifts (e.g., automatically, without requiring user input via user input interface 222) the play position to the shifted portion of the content stream (e.g., to a start time that corresponds to a detected event). In another example, as an alternative to automatically shifting the play position at 310, control circuitry 210 may present a navigation menu option via user input interface 222 that a user may select to trigger the shifting of the play position, if desired. Control circuitry 210 may also provide a system-configurable option and/or a user-configurable option (e.g., via a graphical user interface (GUI) as part of user input interface 222) that sets whether—and under what conditions—any shift identified at 308 is executed automatically at 310 or requires user input via user input interface 222 in order to be executed at 310.

At 312, control circuitry 210 plays the event that corresponds to the shifted position (e.g., the position to which the play position has been shifted at 310) instead of the delayed portion of the content stream that was being played at 302. In this manner, for instance, if a user is viewing a delayed portion of the live content stream (at 302) and an important event (e.g., with importance being related to the rank of the event) occurs at another portion of the stream, system 100 may automatically navigate to that other portion of the stream to play the important event.

Figure 4:
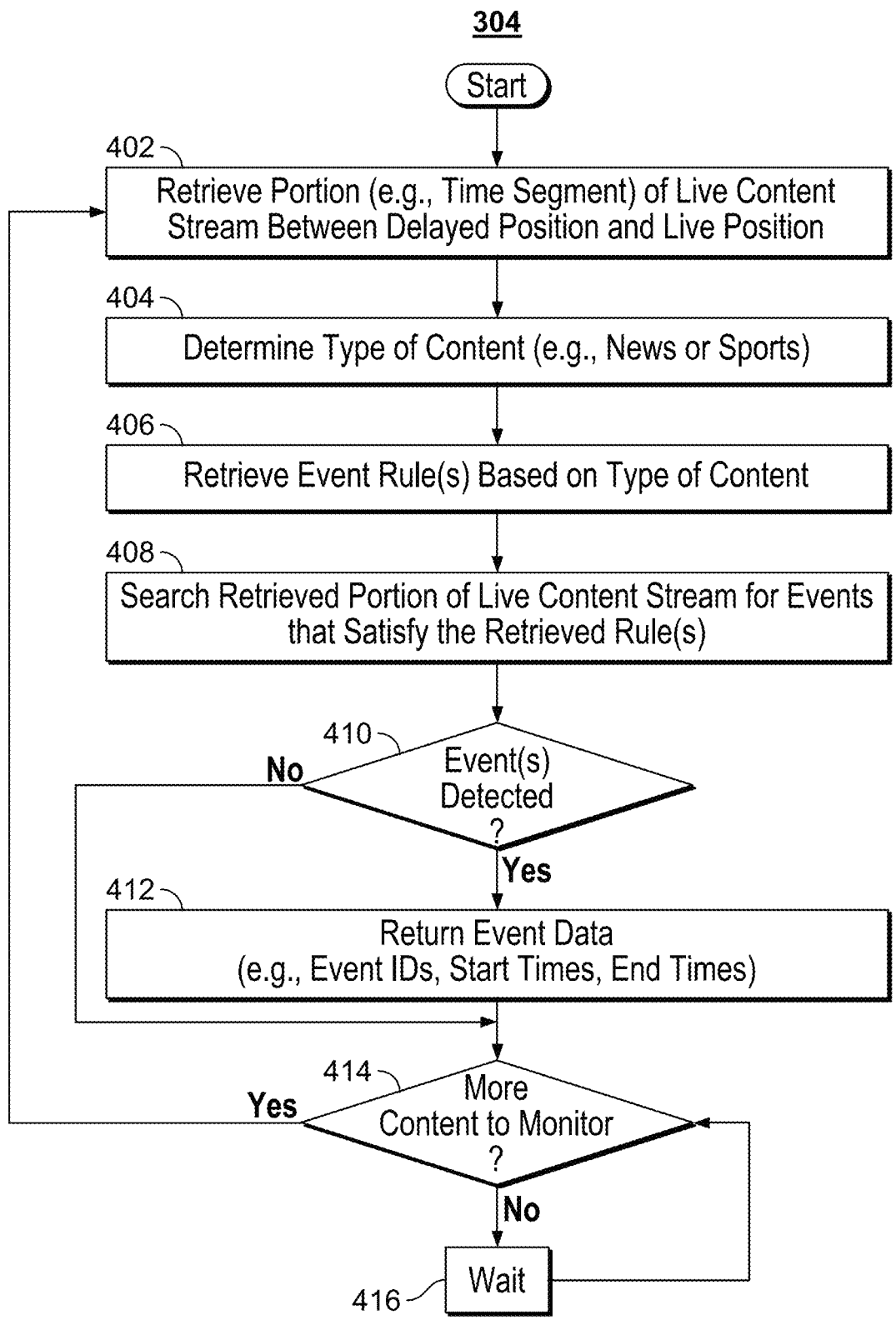
FIG. 4 is an illustrative flowchart of a process for monitoring a live content stream to detect events, in accordance with some embodiments of the disclosure.

FIG. 4 is an illustrative flowchart of process 304 (see FIG. 3) for monitoring a live content stream to detect events, in accordance with some embodiments of the disclosure. At 402, control circuitry 210 retrieves a portion of the live content stream communicated from server 202 or media content source 104 to computing device 110 via communication network 108 for analysis to detect any event(s) that may have occurred at that portion within the content stream. There are a variety of ways in which control circuitry 210 may select portions of the content stream for retrieval at 402 and analysis for event detection. For example, control circuitry 210 may select for retrieval a portion of the live content stream (e.g., that lies at some temporal position or time segment within the stream having a start time, an end time, and/or a duration) that begins with the delayed portion of the stream being played at 302 (sometimes referred to herein as the delayed position) and ends with the current live portion (sometimes referred to herein as the live position) of the stream. In such an example, the portion selected for retrieval at 402 may have a start time that matches the start time of the delayed position and an end time that matches the end time of the live position. Alternatively, control circuitry 210 may divide the content stream into smaller portions and may sequentially select at separate instances of 402 (see 414) the smaller portions for analysis by control circuitry 210. In this way, the processing burden imposed upon control circuitry 210 may be lessened relative to the burden that might result if control circuitry 210 had to analyze larger portions of the content stream. For example, control circuitry 210 may retrieve for analysis a portion of the live content stream that lies at some temporal position within the stream from the delayed position to the live position. As part of retrieving the portion of content at 402, control circuitry may identify the time segment (e.g., by start time, end time, duration, and/or another temporal index) that corresponds to the retrieved portion of content. In this manner, if control circuitry 210 detects an event within the retrieved portion of content, control circuitry 210 can return a temporal index that also corresponds to the event to enable navigation to, and/or playback of, the event. The time segment of the content stream to which an event corresponds may occur at any position within the content stream (e.g., at the delayed position being played at 302, at the live position, or at an intermediate position located somewhere between the delayed position and the live position). For example, the event may occur at a time segment between the delayed portion of the live content stream and a live portion of the live content stream or, in another example, may occur at a live portion of the content stream. By identifying respective time segments (e.g., having start times, end times, durations, and/or another temporal index) of events detected in the content stream, system 100 is enabled to navigate to the proper portions of the stream for playback of those events.

At 404, control circuitry 210 determines a type of the content retrieved at 402. Examples of the type of retrieved content may be broadcasted sporting event content, news content, and/or another type of live content. Control circuitry 210 may make the determination at 404 in a variety of ways. For example, control circuitry 210 may determine the type of content based on a content-type field included in a header of one or more packets within which the retrieved portion of content was received at computing device 110. The content-type field may include a code that indicates the type of the content.

Figure 5:
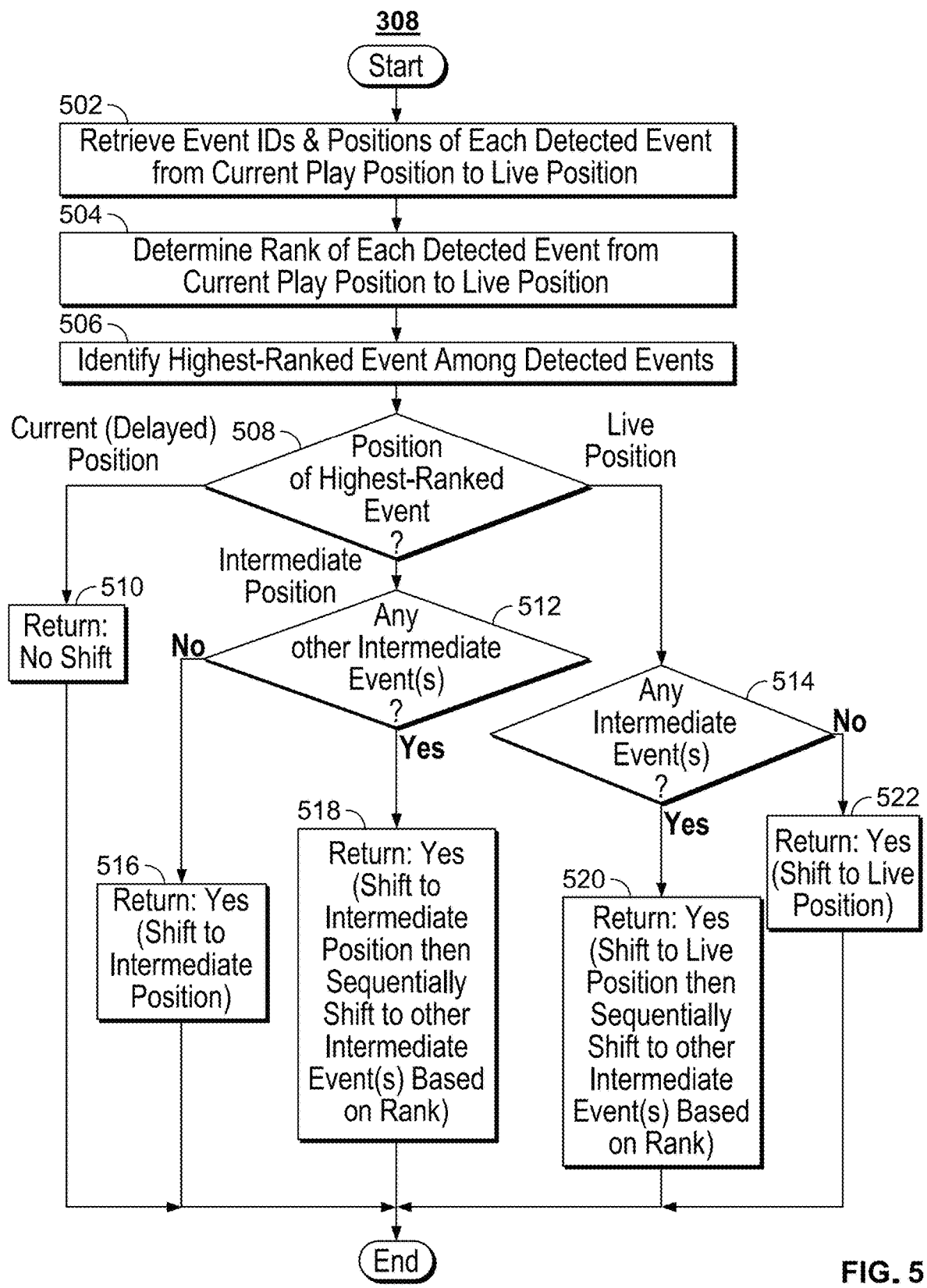
FIG. 5 is a flowchart of an illustrative process for facilitating playback position shifts within a content stream, in accordance with some embodiments of the disclosure.

At 406, based on the type of the retrieved content determined at 404, control circuitry 210 retrieves from storage 212 one or more event rules that define types of events for that type of content, indicate how such events are to be detected within content streams of that type, and/or indicate how to compute ranks for such events (see 504 of FIG. 5). For example, the event rules for content of the sporting event type may indicate that any change in a score of the sporting event qualifies as an event and should be detected. Such event rules may also indicate how control circuitry 210 may detect score changes in content of the sporting event type. For instance, control circuitry 210 may detect score changes by reading a score field communicated as part of a header of one or more packets used to communicate the retrieved portion of content to computing device 110. Control circuitry 210 may also detect score changes in content by performing image processing on image frames of the content to identify, and read a score from, a scoreboard.

The event rules for content of the news broadcast type may identify certain alerts, keywords, or keyword phrases that, if uttered in an audio portion of the content stream and/or present in a news ticker of a video portion of the content stream, would qualify as events and should be detected. Such event rules may also indicate how control circuitry 210 may detect such alerts, keywords, or keyword phrases in content of the news broadcast type. For instance, control circuitry 210 may detect such alerts, keywords, or keyword phrases by reading an alert field and/or closed-captioned text that may be communicated from server 202, media content source 104, and/or media guidance data source 106 to computing device 110 in connection with the retrieved portion of content. Control circuitry 210 may also detect score changes in content by performing image processing on image frames of the content to identify and read any alerts, tickers, and/or closed captioning text that may be included in the image frames.

Each event may have one of multiple possible ranks (e.g., low importance, medium importance, high importance) that may indicate a relative importance of the event (e.g., relative to other events) and that control circuitry 210 may use in determining which of multiple detected events to navigate to or play or which of the events should have a corresponding navigation menu option presented. To that end, the event rules retrieved at 406 may also indicate how to compute ranks for certain types of events (see 504 of FIG. 5). For example, for events within content of the sporting event broadcast type, a score change event may be assigned a high rank, a penalty event may be assigned a medium rank, and a change of possession may be assigned a low rank. For events within content of the news broadcast type, the event rules may indicate that a presidential address should be assigned a high rank, and may also include a table that indicates which rank corresponds to each of the alerts, keywords, or keyword phrases that qualify as events.

At 408, control circuitry 210 searches the portion of the content stream retrieved at 402 for any events that satisfy the rules retrieved at 406 for the type of content determined at 404. If control circuitry 210 does not identify within the portion of the content stream retrieved at 402 any events that satisfy the retrieved rules ("No" at 410), then control passes to 414 to determine whether any additional portion of the content stream remains to be analyzed. If, on the other hand, control circuitry 210 identifies within the portion of the content stream retrieved at 402 any events that satisfy the retrieved rules ("Yes" at 410), then at 412 control circuitry 210 generates, stores, and/or returns event data for each identified event. The event data for each identified event may include, for instance, an event identifier that uniquely identifies the event and a temporal index or identifier, such as a start time, end time, and/or duration of the event within the content stream.

At 414, control circuitry 210 determines whether any additional portion of the content stream remains to be analyzed. The determination made at 414 may depend at least in part on how analysis of the content stream is triggered, as discussed above. For example, analysis of the content stream may be repeated periodically after a predetermined repetition period (or at a predetermined repetition rate). In such an example, if control circuitry 210 determines that no additional portion of the content stream remains to be analyzed ("No" at 414), then at 416, control circuitry 210 waits for a predetermined period of time. If, on the other hand, control circuitry 210 determines that an additional portion of the content stream remains to be analyzed ("Yes" at 414), then control circuitry 210 retrieves the additional portion of the content stream at 402 for analysis in the manner described above.

FIG. 5 is an illustrative flowchart of process 308 (see FIG. 3) for facilitating playback position shifts within a content stream, in accordance with some embodiments of the disclosure. At 502, control circuitry 210 retrieves event identifiers and temporal identifiers (e.g., positions) of each of the events detected at 306 from the current play position (e.g., the position of the delayed portion of the content stream being played at 302) to the live position. At 504, control circuitry 210 uses the event rules retrieved at 406 in the manner described above to determine the ranks that correspond to the detected events, respectively. The ranks are used as a basis upon which to determine whether to shift a play position and, if so, to which portion of the content stream. Detecting multiple events and assigning respective ranks to those events enables system 100 to provide a variety of useful options for displaying, and/or navigating to, relevant portions of the live content stream. Such options, for example, may be presented via GUI for selection by the user via user input interface 222, automatically selected by the system without any user input, or configured based on a user-defined or system-defined configuration setting. For example, if control circuitry 210 detects and ranks two events within the content stream, control circuitry 210 may determine that the rank of a first of the two events is greater than the rank of a second of the two events, in response, play the first event instead of the second event and/or play the second event after the first event has been played. At 506, control circuitry 210 identifies the highest-ranked event among the detected events.

In various aspects, the determination of whether to shift a play position of the content stream and, if so, to which portion of the content stream, may also depend at least in part on the temporal portion of the content stream within which the event(s) occur. For instance, if multiple of the detected events have the highest rank, in some cases, at 506 control circuitry 210 identifies as the highest-ranked event the event that has the highest rank and is nearest in time to the delayed position (e.g., the delayed portion of the content stream being played at 302).

At 508, control circuitry 210 determines the position (e.g., temporal index, such as the start time, end time, and/or duration) of the event identified at 506. If the position of the event identified at 506 matches (and/or overlaps with) the position of the live portion of the content stream ("Live Position" at 508), then control passes to 514. At 514, control circuitry 210 determines whether any additional events occurring at intermediate positions between the delayed position and the live position are included among the events having identifiers retrieved at 502. If no intermediate events are included among the events having identifiers retrieved at 502 ("No" at 514), then at 522 control circuitry 210 returns a message indicating that a shift (or an optional shift) to the live position is warranted. If, on the other hand, one or more intermediate events are included among the events having identifiers retrieved at 502 ("Yes" at 514), then at 520 control circuitry 210 returns a message indicating that a shift (or an optional shift) to the live position is warranted and that after the event at the live position has been played, subsequent sequential shifts (or optional shifts) to the other intermediate events, if any, identified at 514 are warranted in an order based on rank (e.g., in an order from high rank to low rank).

Figure 6:
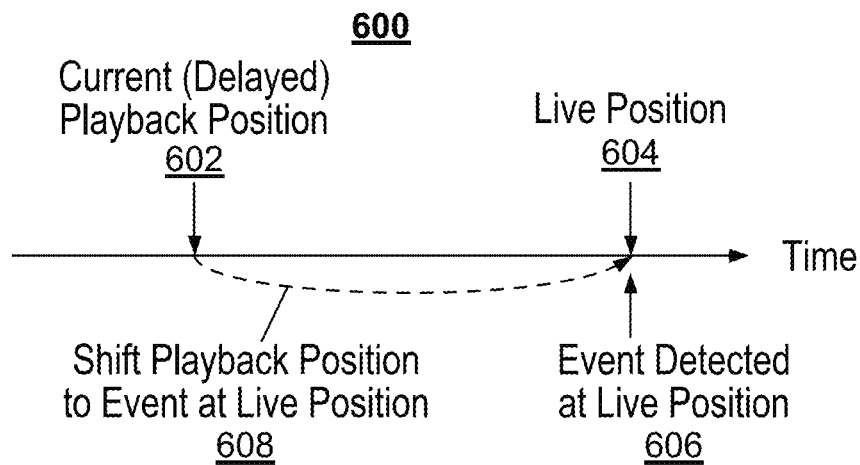
FIG. 6 is a timeline showing an illustrative scenario in which a playback position is shifted to a live portion of a live content stream, in accordance with some embodiments of the disclosure.

FIG. 6 includes a timeline 600 showing an example of a scenario in which a play position is shifted (608) from the current (delayed) playback position 602 (being played at 302) to the live position 604 of a live content stream to play an event 606 detected at the live position 604, in accordance with some embodiments of the disclosure. In particular, the event 606 is detected at the live position 604 and, because no other events are detected in the analyzed portion of the content stream, the play position is shifted (608) from the delayed position 602 to the live position 604 to play the event 606.

Referring back to FIG. 5, if the event identified at 506 is positioned at an intermediate position in between the delayed position and the live position of the content stream ("Intermediate Position" at 508), then control passes to 512. At 512, control circuitry 210 determines whether any additional events occurring at intermediate positions between the delayed position and the live position are included among the events having identifiers retrieved at 502. If no intermediate events are included among the events having identifiers retrieved at 502 ("No" at 512), then at 516 control circuitry 210 returns a message indicating that a shift (or an optional shift) to the intermediate position of the event identified at 506 is warranted. If, on the other hand, one or more intermediate events are included among the events having identifiers retrieved at 502 ("Yes" at 512), then at 518 control circuitry 210 returns a message indicating that a shift (or an optional shift) to the intermediate position of the event identified at 506 is warranted and that after the event at the intermediate position has been played, subsequent sequential shifts (or optional shifts) to the other intermediate events, if any, identified at 512 are warranted in an order based on rank (e.g., in an order from high rank to low rank).

Figure 7:
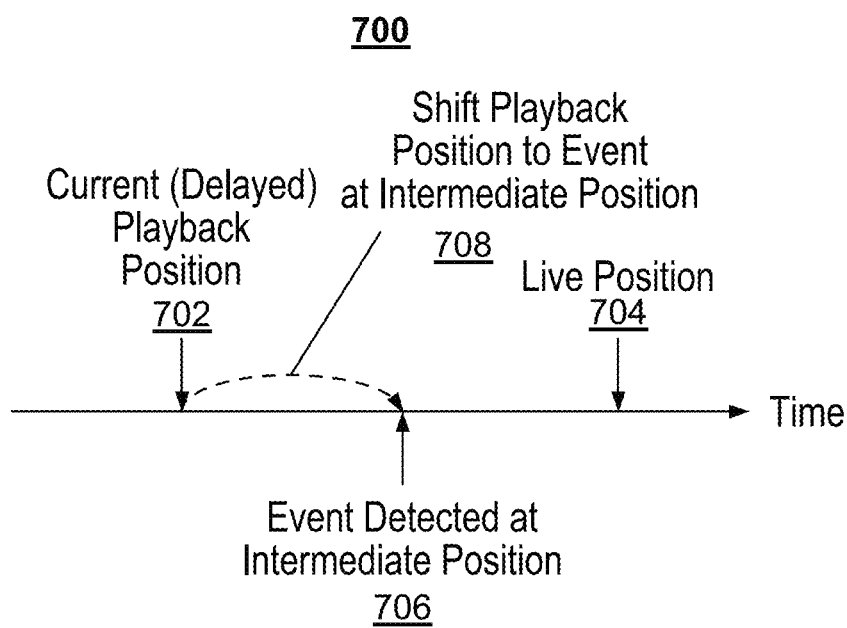
FIG. 7 is a timeline illustrating a scenario in which a playback position is shifted to an intermediate portion of a live content stream, in accordance with some embodiments of the disclosure.

FIG. 7 includes a timeline 700 showing an example of a scenario in which a playback position 702 is shifted (708) to an intermediate portion 706 of a live content stream, in accordance with some embodiments of the disclosure. In particular, an event 706 is detected at an intermediate position between the current (delayed) position 702 and the live position 704 and, because no other events are detected in the analyzed portion of the content stream, the play position is shifted (708) from the delayed position 702 to the intermediate position 706 to play the event occurring at the intermediate position 706.

Figure 8:
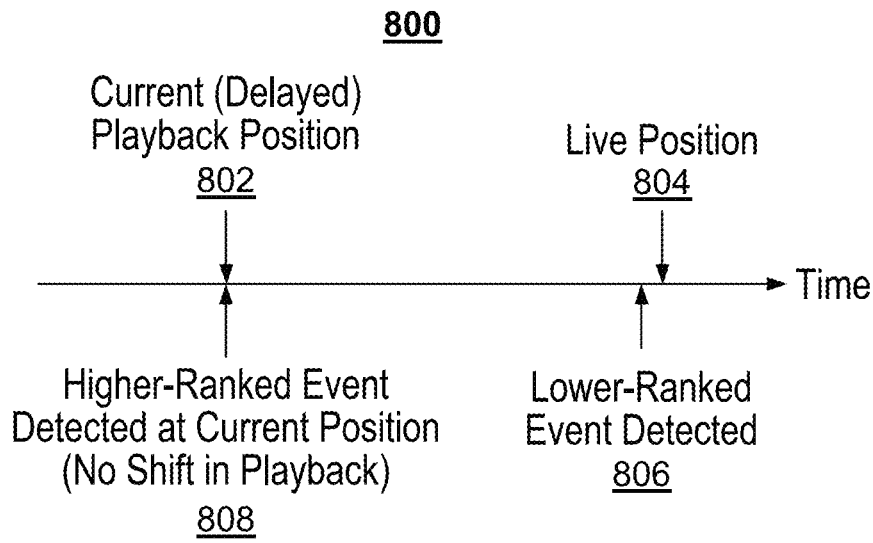
FIG. 8 is a timeline showing an illustrative scenario in which a playback position remains unshifted based on the relative ranks of multiple detected events, in accordance with some embodiments of the disclosure.

Referring back to FIG. 5, if the position of the event identified at 506 matches (and/or overlaps with) the position of the delayed portion of the content stream being played at 302 ("Current (Delayed) Position" at 508), then at 510 control circuitry 210 returns a message indicating that no shift is warranted. FIG. 8 includes a timeline 800 showing an example of a scenario in which a playback position 802 remains unshifted based on the relative ranks of multiple detected events (806, 808), in accordance with some embodiments of the disclosure. In particular, a first event 806 is detected at an intermediate position between the current position 802 and the live position 804, and a second event 808 is detected at the current position 802. The second event 808 is the higher-ranked event among the two detected events 806, 808, and, because the second event 808 is positioned at the current position 802, no shift is warranted.

Figure 9:
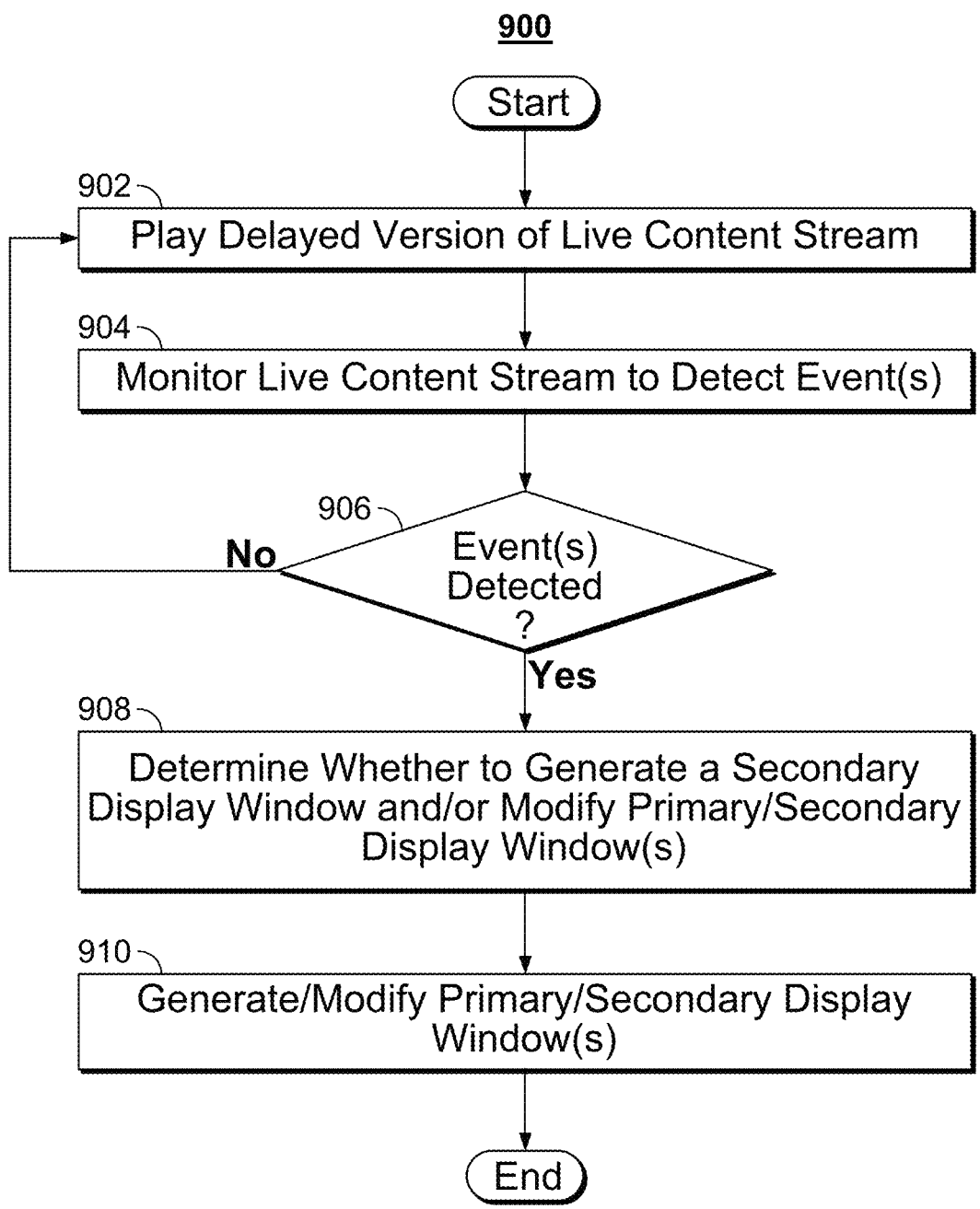
FIG. 9 depicts an illustrative flowchart of another process for displaying content based on event monitoring, in accordance with some embodiments of the disclosure.

FIG. 9 depicts an illustrative flowchart of process 900, for monitoring a live content stream to detect events and controlling the display of content and/or navigation menu options based on any detected events, that may be implemented by using system 100 in accordance with some embodiments of the disclosure. At 902, in a manner similar to that described above in connection with 302 (FIG. 3), control circuitry 210 plays a delayed portion of the live content stream in a primary display window presented via display 220.

At 904, in a manner similar to that described above in connection with 304 (FIG. 3), control circuitry 210 monitors the live content stream being received at computing device 110 via communication network 108 to detect any events, such as a score change in a live sporting event or an alert in a live news broadcast, that may occur in the content stream.

At 906, in a manner similar to that described above in connection with 306 (FIG. 3), control circuitry 210 determines whether one or more events in the content stream have been detected at 904. If no event in the content stream has been detected at 904 ("No" at 906), then the delayed portion of the content stream continues to be played at 902. If, on the other hand, one or more events in the content stream have been detected at 904 ("Yes" at 906), then, based on the event(s) detected at 904, control circuitry 210 determines at 908 whether to generate a secondary display window to be presented via display 220 and/or whether and how to modify any aspect(s) of the primary and/or secondary display windows. For instance, the event may be played via the secondary display window, with the secondary display window being overlaid upon the primary display window. Additionally or alternatively, control circuitry 210 may modify an aspect of the primary or secondary display windows, such as a frame rate at which the event is played via the secondary display window, a size of the secondary display window, a bit rate at which the event is played via the secondary display window, and/or another aspect of the secondary display window. Additional details regarding how control circuitry 210 may make the determination at 908 are provided below in the context of FIG. 10. At 910, control circuitry 210 generates and/or modifies the primary and/or secondary display windows based upon a result of the determination at 908.

Figure 10:
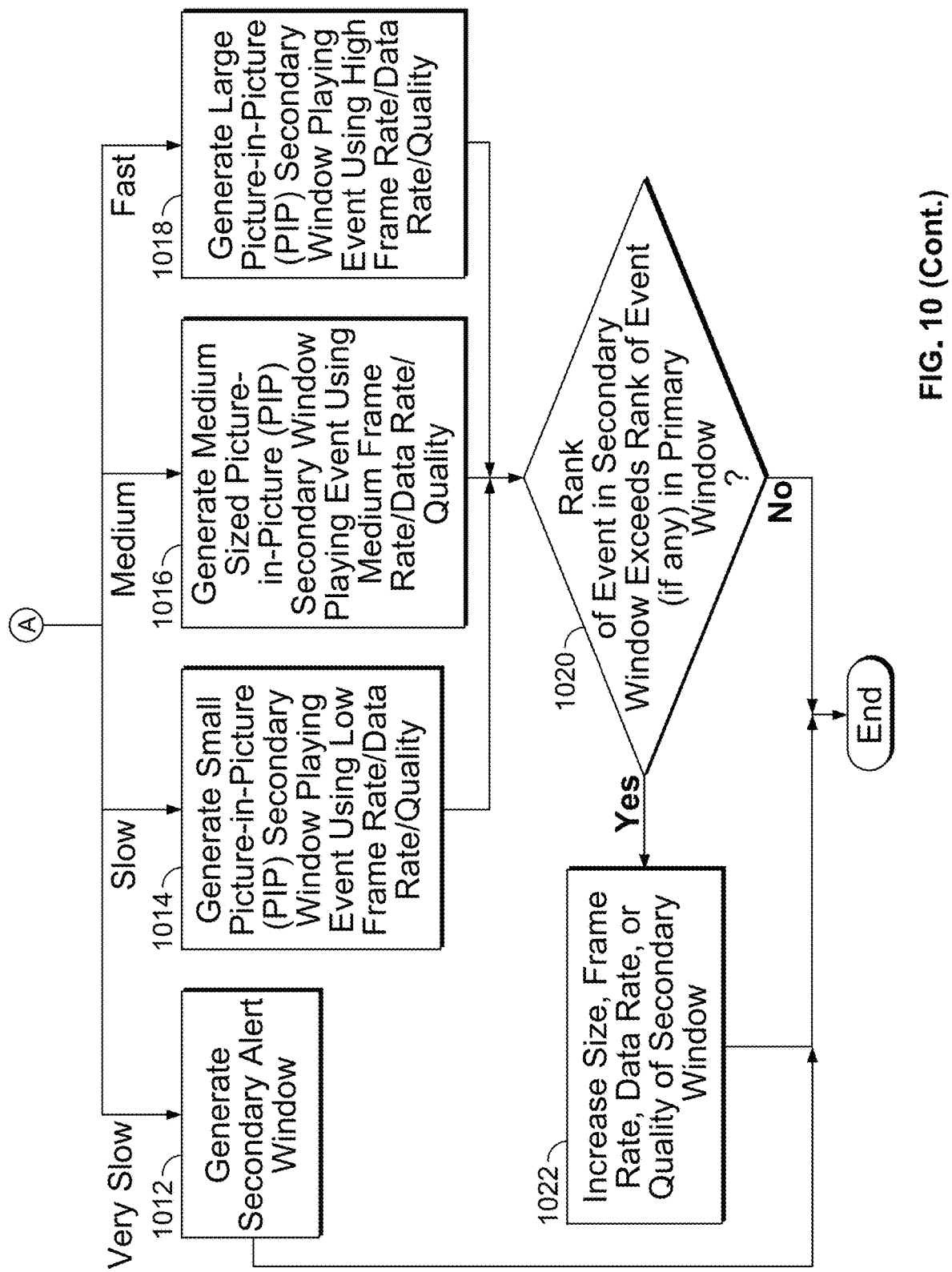
FIG. 10 is a flowchart of an illustrative process for generating and/or modifying primary and/or secondary display windows based on a network condition, in accordance with some embodiments of the disclosure.

FIG. 10 is an illustrative flowchart of process 908 (see FIG. 9) for determining whether and how to generate, and/or modify aspects of, primary and/or secondary display windows, in accordance with some embodiments of the disclosure.

Steps 1002, 1004, and 1006 are executed in a manner similar to that described above in connection with steps 502, 504, 506, respectively, of FIG. 5. In particular, at 1002, control circuitry 210 retrieves event identifiers and temporal identifiers (e.g., positions) of each of the events detected at 906 from the current play position (e.g., the position of the delayed portion of the content stream being played at 902) to the live position. At 1004, control circuitry 210 uses event rules (such as the rules described above in connection with 406 of FIG. 4) to determine the ranks that correspond to the detected events, respectively. As described below (see 1020), the ranks may be used as a basis upon which to determine whether and/or how to modify an aspect of the secondary display window. At 1006, control circuitry 210 identifies the highest-ranked event among the detected events.

In some aspects, control circuitry 210 is configured to monitor the condition of communication network 108 and control the display of content and/or navigation menu options based on the sufficiency of the network condition. For instance, if the condition is sufficient (e.g., if the data rate is sufficiently high), control circuitry 210 may generate the secondary display window to display any detected events in a manner commensurate with the network condition (e.g., where aspects of the secondary display window, such as bit rate, frame rate, and/or the like, change to suit the network condition). If the network condition is insufficient, instead of generating the secondary display window, control circuitry 210 may provide a static user option via a GUI that the user may select via the user input interface 222 to navigate to a detected event. By modifying aspects of the primary and/or secondary display windows based on the status of communication network 108, system 100 can enable the user to view multiple portions of the content stream without overtaxing computing resources (e.g., of computing device 110) and potentially causing stalls or other degradations in the viewing experience.

At 1008, control circuitry 210 determines (e.g., retrieves from storage 212, from a network monitoring device (not shown in FIG. 2) of computing device 110, or from any other suitable source) a QoS-related factor associated with the communication of the content stream to computing device 110 over communication network 108. The QoS-related factor, for instance, may indicate a qualitative and/or quantitative condition or status of communication network 108. The QoS-related factor may serve as at least a portion of the basis upon which the determination is made as to whether— and how—to generate, and/or modify an aspect of, the primary or secondary display windows. In one example, the QoS-related factor indicates whether the connection speed between the computing device 110 and the source of the content stream (e.g., server 102 and/or media content source 104) is very slow, slow, medium, or fast.

Figure 11A:
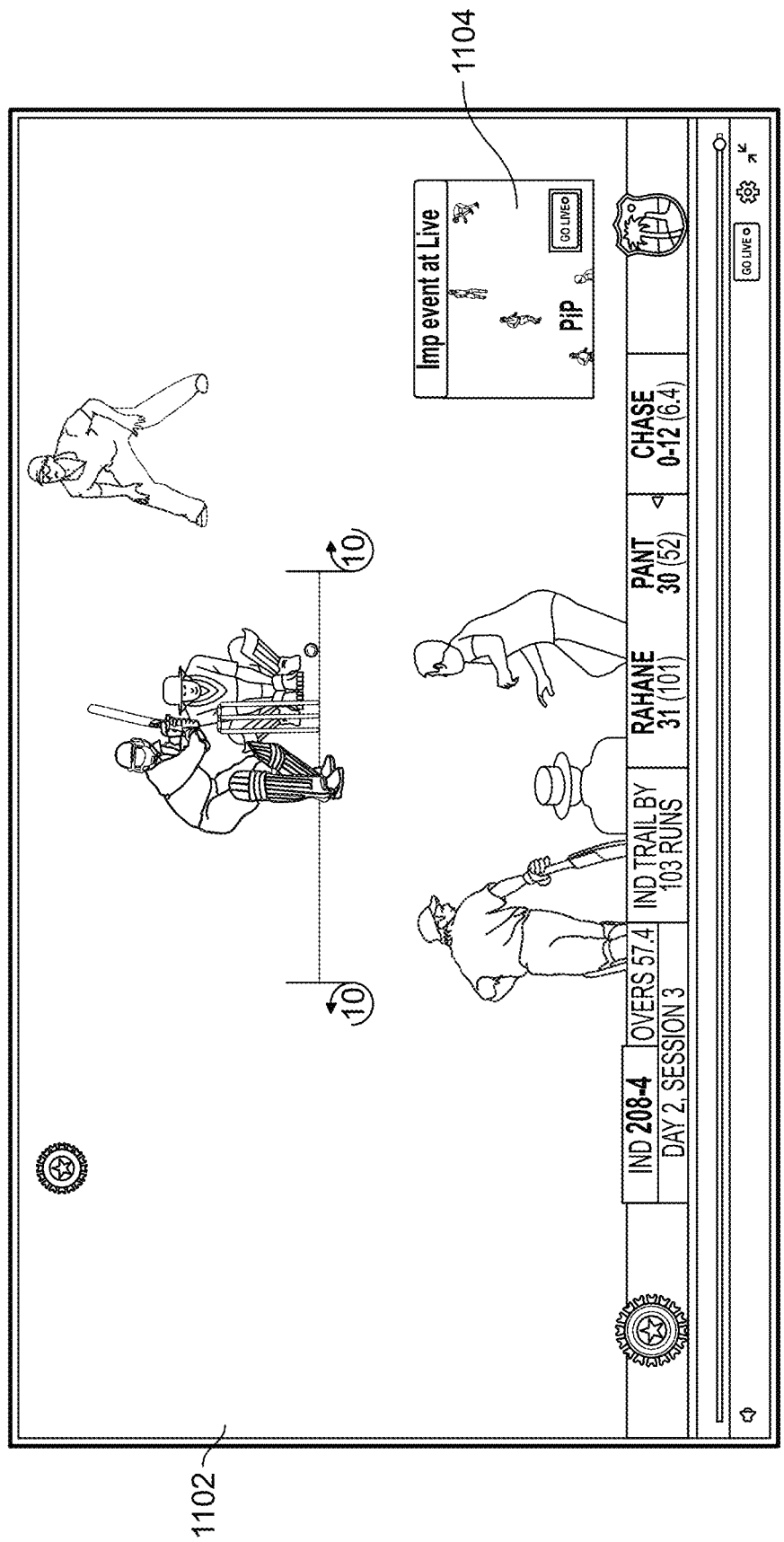
FIG. 11A shows an illustrative view of a primary display window and a secondary display window in which streamed content may be presented, in accordance with some embodiments of the disclosure.
Figure 11B:
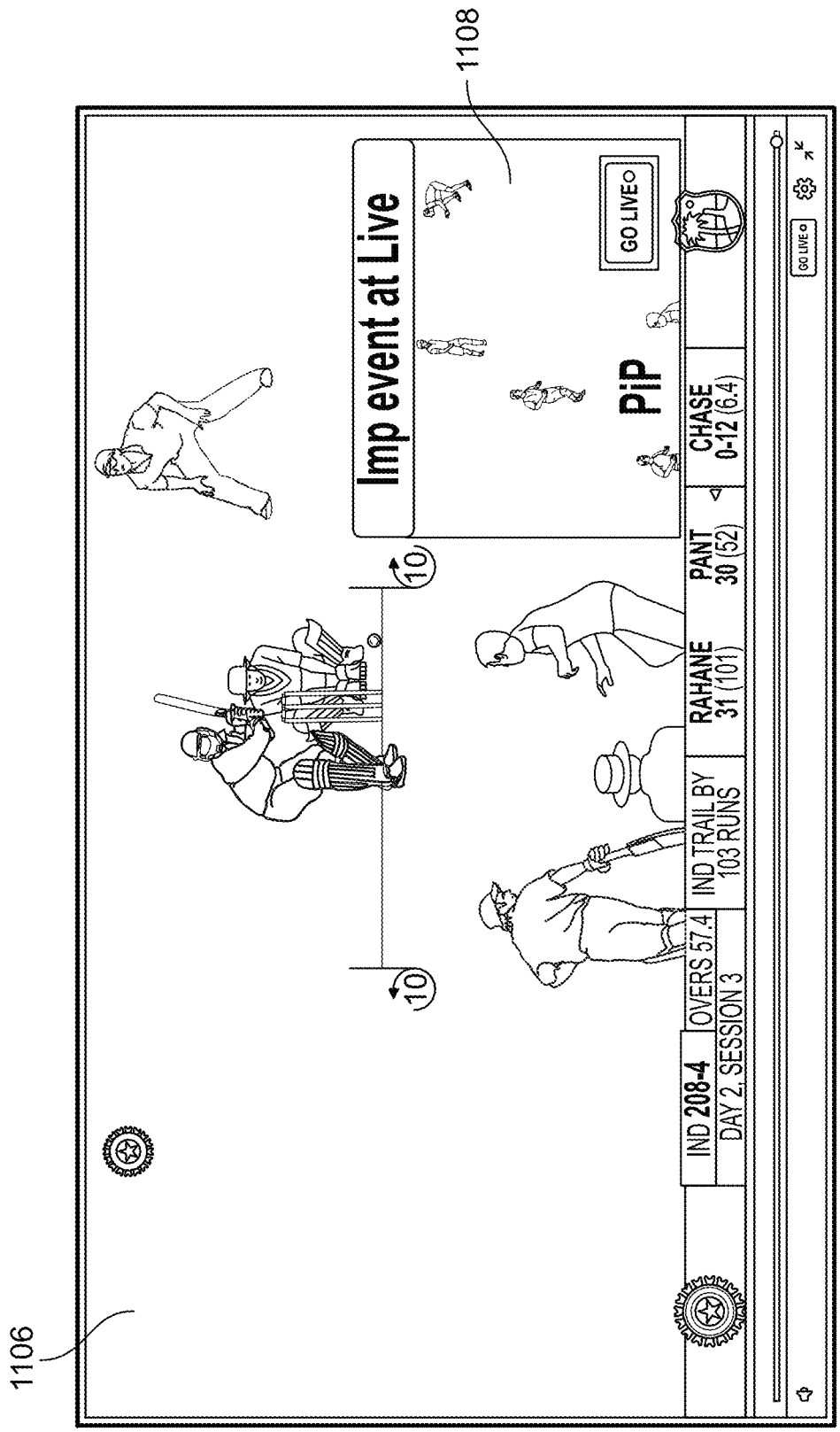
FIG. 11B shows a view in which a size of the secondary display window of FIG. 11A is enlarged, in accordance with some embodiments of the disclosure.

If the QoS-related factor indicates that the connection speed is slow ("Slow" at 1010), then at 1014 control circuitry 210 generates a small secondary display window (e.g., a picture-in-picture window) within which the event is played using a low frame rate, data rate, and/or quality. If the QoS-related factor indicates that the connection speed is medium ("Medium" at 1010), then at 1016 control circuitry 210 generates a medium-sized secondary display window within which the event is played using a medium frame rate, data rate, and/or quality. If the QoS-related factor indicates that the connection speed is fast ("Fast" at 1010), then at 1018 control circuitry 210 generates a large secondary display window within which the event is played using a high frame rate, data rate, and/or quality. For instance, as shown in FIG. 11A, the delayed version of the content stream may be presented via primary display window 1102 and the detected event may be played within a small secondary display window 1104, as described at 1014. The delayed version of the content stream may be presented via primary display window 1106 in FIG. 11B as well. However, in the scenario depicted in FIG. 11B, the detected event is played within a medium-sized secondary display window 1108, as described at 1016.

Figure 12A:
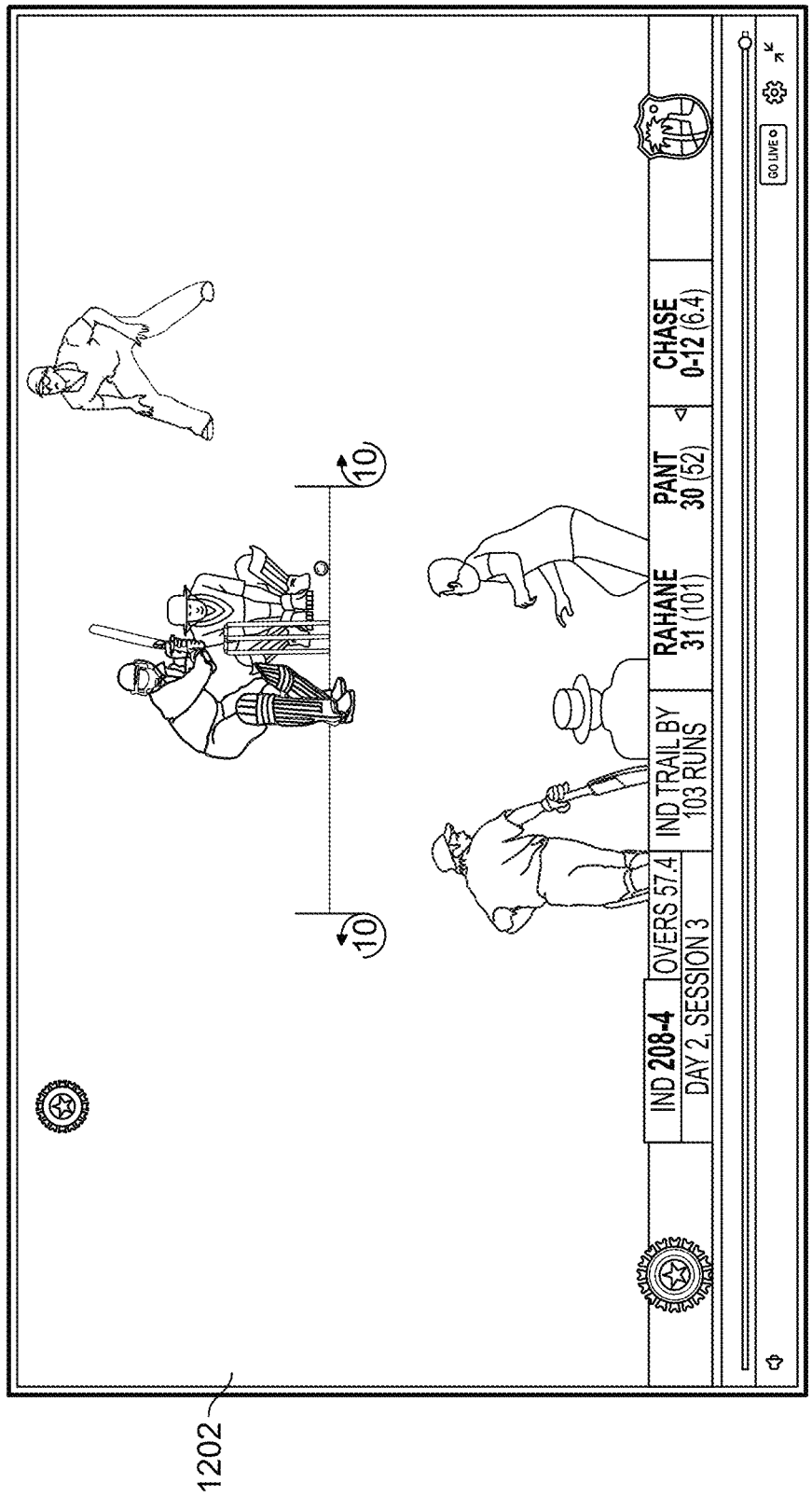
FIG. 12A shows an illustrative view of another primary display window in which streamed content may be presented, in accordance with some embodiments of the disclosure.
Figure 12B:
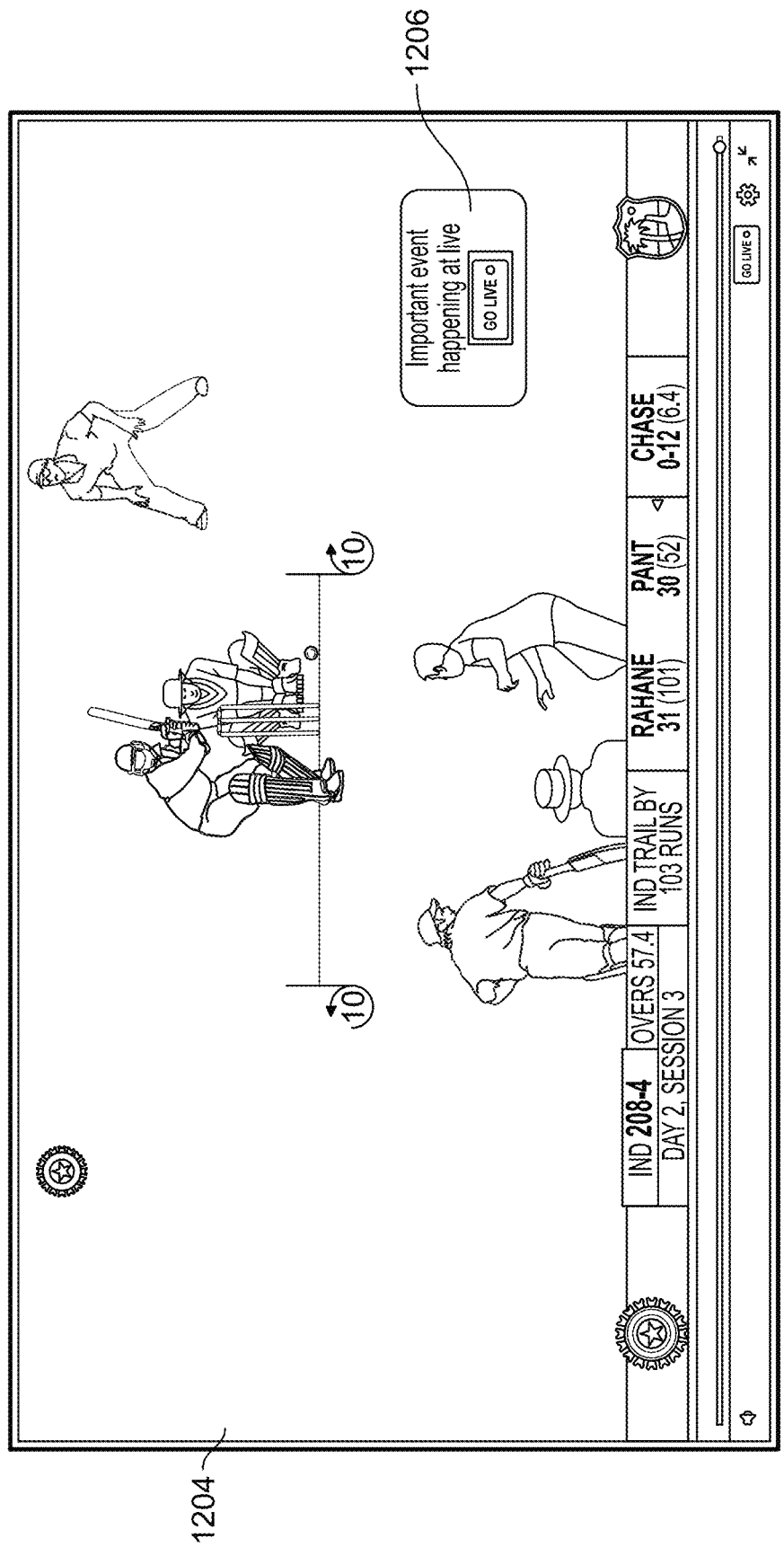
FIG. 12B shows a view in which a secondary display window including an alert is overlaid upon the primary display window of FIG. 12A, in accordance with some embodiments of the disclosure.

If the QoS-related factor indicates that the connection speed is very slow ("Very Slow" at 1010), then at 1012 control circuitry 210 generates a static secondary alert window. For instance, as shown in FIG. 12A, the delayed version of the content stream may be presented via primary display window 1202. FIG. 12B depicts a scenario in which a static secondary alert window 1206 (FIG. 12B) may be generated and overlaid upon primary display window 1204 to alert the user of the event and to provide the user with the option (e.g., a "Go Live" option) to select the alert window to cause control circuitry 210 to navigate to the event (which may occur at the live position or another position in the content stream) for playback in the primary display window.

In some aspects, at 1020, control circuitry 210 determines whether the rank of the event being displayed within the secondary display window exceeds the rank of the event (if any) detected in the content being displayed within the primary window. If no event is being displayed in the primary window, or if the rank of the event being displayed within the secondary display window exceeds the rank of the event being displayed within the primary window ("Yes" at 1020), then at 1022 control circuitry increases an aspect of the secondary display window, such as a window size, a frame rate, a data rate, and/or a video quality. If the rank of the event being displayed in the secondary display window does not exceed the rank of the event being displayed in the primary display window ("No" at 1020), then process 908 terminates. Since the rank of the event may correspond to the relative importance of the event, by modifying aspects of the secondary display window based on the rank of the event, the system may effectively balance how prominently the event is displayed via the secondary display window with the relative importance of the event. In this manner, for instance, for minimally important events, the system can avoid or minimize any disruption to the user's viewing of the content in the primary display window that might be caused by prominently displaying the event via the secondary display window and can reserve such disruptions for important events only.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for displaying content based on event monitoring, comprising:
   playing a delayed portion of a live content stream via a primary display window;
   in response to determining that the delayed portion is delayed behind the live content stream by more than a particular time period:
      initiating image processing analysis of a current portion of the live content stream to detect an event occurring in the current portion of the live content stream;
      determining a rank of the event; and
      determining that the rank of the event occurring in the current portion of the live content stream exceeds a rank of the delayed portion playing in the primary display window, wherein the event is played via a secondary display window and the secondary display window is overlaid upon the primary display window; and
   in response to the determining that the rank of the event occurring in the current portion of the live content stream that is played via the secondary display window exceeds the rank of the delayed portion playing in the primary display window, automatically modifying a bit rate at which the event is played via the secondary display window without user interface input requesting modification of the bit rate.

2. The method of claim 1, further comprising:
   determining a status of a communication network by which the live content stream is communicated; and
   wherein the modifying the bit rate at which the event is displayed via the secondary display window is further based on the status of the communication network.

3. The method of claim 2, wherein the status of the communication network indicates a rate at which live content stream data is communicated via the communication network, and wherein the modifying the bit rate at which the event is displayed via the secondary display window is further based on the rate at which the live content stream data is communicated via the communication network.

4. The method of claim 1, further comprising:
   determining a status of a communication network by which the live content stream is communicated; and
   based on the status of the communication network, displaying the secondary display window.

5. The method of claim 1, further comprising:
   determining a status of a communication network by which the live content stream is communicated;
   based on the status of the communication network, selecting a size of the secondary display window from among a plurality of predetermined sizes; and
   displaying the secondary display window in the selected size.

6. The method of claim 1, further comprising:
   determining an event type for the detected event;
   retrieving stored event rules which identify event ranks for each of a plurality of event types including the event type for the detected event; and
   determining the rank of the event based on the stored event rules and the event type for the detected event.

7. The method of claim 1, further comprising, in response to detecting the event occurring in the current portion of the live content stream, generating for display the secondary display window.

8. The method of claim 1, wherein:
   the event is a first event; and
   the method further comprises:
      detecting a second event while the secondary display window is not being displayed;
      determining a status of a communication network by which the live content stream is communicated; and based on the status of the communication network, displaying an event alert window instead of the secondary display window.

9. The method of claim 8, further comprising displaying, with the event alert window, an option to navigate to the detected second event.

10. The method of claim 1, further comprising, in response to the determining that the rank of the event that is played via the secondary display window exceeds the rank of the delayed portion playing in the primary display window, additionally modifying one other quality aspect of the secondary display window.

11. A system for displaying content based on event monitoring, comprising:
a communication port configured to receive a live content stream via a communication network;
a memory configured to buffer the received live content stream for playback;
a display configured to present a primary display window and a secondary display window; and
control circuitry configured to:
play a delayed portion of the live content stream via the primary display window;
in response to determining that the delayed portion is delayed behind the live content stream by more than a particular time period:
initiate image processing analysis of a current portion of the live content stream to detect an event occurring in the current portion of the live content stream;
determine a rank of the event; and
determine that the rank of the event occurring in the current portion of the live content stream exceeds a rank of the delayed portion playing in the primary display window, wherein the event is played via the secondary display window and the secondary display window is overlaid upon the primary display window; and
in response to determining that the rank of the event occurring in the current portion of the live content stream that is played via the secondary display window exceeds the rank of the delayed portion playing in the primary display window, automatically modify a bit rate at which the event is played via the secondary display window without user interface input requesting modification of the bit rate.

12. The system of claim 11, wherein the control circuitry is further configured to:
determine a status of the communication network by which the live content stream is communicated; and
wherein modifying the bit rate at which the event is displayed via the secondary display window is further based on the status of the communication network.

13. The system of claim 12, wherein the status of the communication network indicates a rate at which live content stream data is communicated via the communication network, and wherein the modifying the bit rate at which the event is displayed via the secondary display window is further based on the rate at which the live content stream data is communicated via the communication network.

14. The system of claim 11, wherein the control circuitry is further configured to:
determine a status of the communication network by which the live content stream is communicated;
based on the status of the communication network, select a size of the secondary display window from among a plurality of predetermined sizes; and
display the secondary display window in the selected size.

15. The system of claim 11, wherein the control circuitry is further configured to:
determine an event type for the detected event;
retrieve stored event rules which identify event ranks for each of a plurality of event types including the event type for the detected event; and
determine the rank of the event based on the stored event rules and the event type for the detected event.

16. The system of claim 11, wherein the control circuitry is further configured to, in response to detecting the event occurring in the current portion of the live content stream, generate for display the secondary display window.

17. The system of claim 11, wherein:
the event is a first event; and
the control circuitry is further configured to:
detect a second event while the secondary display window is not being displayed;
determine a status of the communication network by which the live content stream is communicated; and
based on the status of the communication network, display an event alert window instead of the secondary display window.

18. The system of claim 17, wherein the control circuitry is further configured to display, with the event alert window, an option to navigate to the second detected event.

19. The system of claim 11, wherein the control circuitry is further configured to, in response to the determining that the rank of the event that is played via the secondary display window exceeds the rank of the delayed portion playing in the primary display window, additionally modify one other quality aspect of the secondary display window.

20. The method of claim 1, wherein:
the method further comprises detecting an amount of delay between the delayed portion of the live content stream and the live content stream;
the particular time period is a predetermined threshold delay amount; and
the determining that the delayed portion is delayed behind the live content stream by more than the particular time period comprises determining the amount of delay exceeds the predetermined threshold delay amount.

* * * * *